J. F. KELLER.
BOOT FOR SEEDING MACHINES.
No. 10,649. Reissued Oct. 6, 1885.
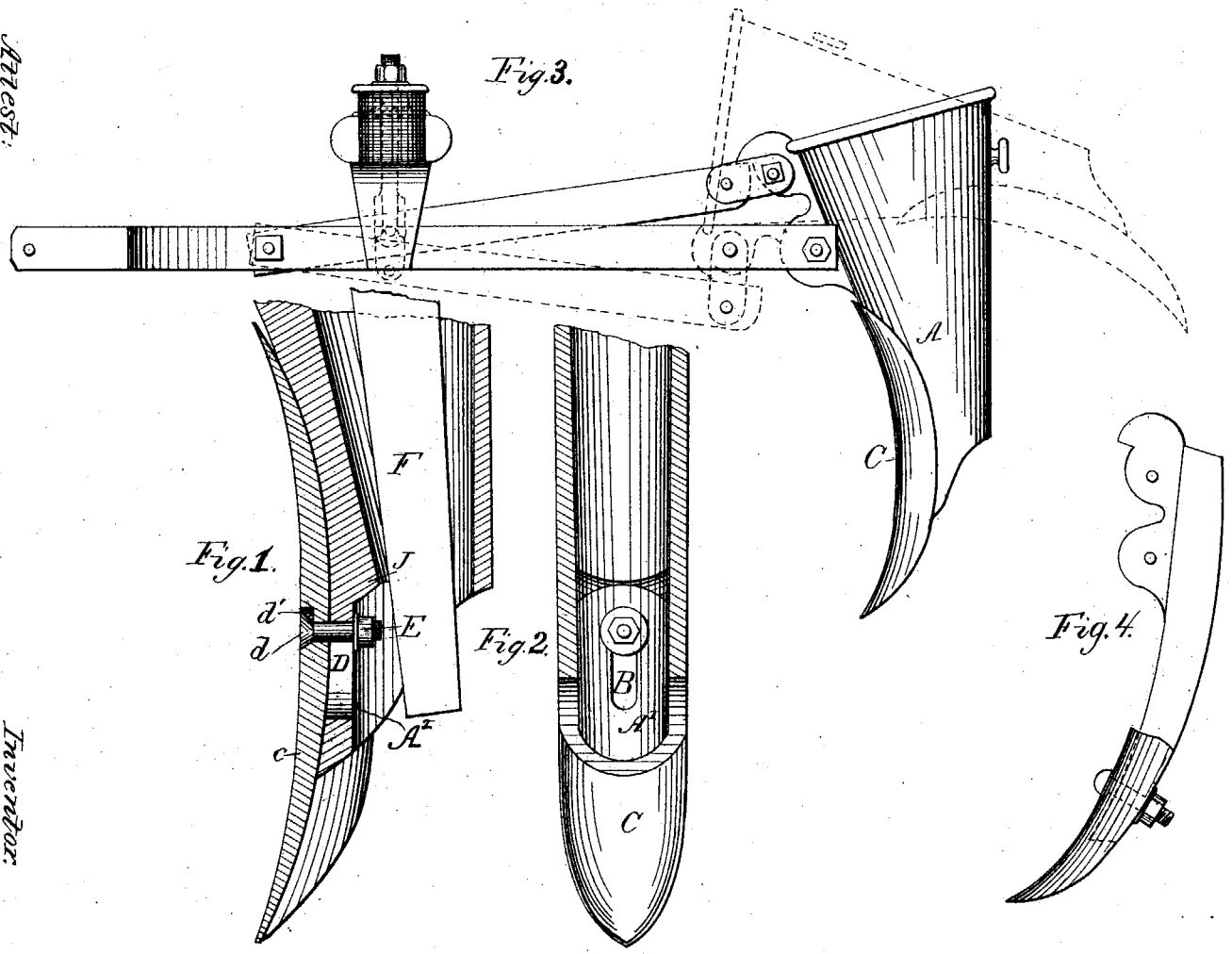
Witnesses:
W. D. Harrington.
Walter S. Dodge.
Inventor:
John F. Keller
by.
N. PETERS, Photo-Lithographer, Washington, D. C.

UNITED STATES PATENT OFFICE.

JOHN F. KELLER, OF SHEPHERDSTOWN, WEST VIRGINIA.

BOOT FOR SEEDING-MACHINES.

SPECIFICATION forming part of Reissued Letters Patent No. 10,649, dated October 13, 1885,

Original No. 269,944, dated January 2, 1883. Application for reissue filed August 30, 1884. Serial No. 14 ,995.

*To all whom it may concern:*

Be it known that I, JOHN F. KELLER, a citizen of the United States, and a resident of Shepherdstown, in the county of Jefferson and State of West Virginia, have invented certain new and useful Improvements in Boots and Adjustable Points or Blades for Seeding-Machines, of which the following is a description.

The invention relates particularly to the metallic tube technically known as the "boot," which serves as a protecting casing or shield for the flexible tube through which the grain is conducted to its point of discharge upon the ground; and it consists in certain novel features in the construction of the boot, as will be first described, and then specifically and distinctly claimed.

In the drawings, Figure 1 is a vertical central section from front to rear through the lower portion of a boot in which my invention is embodied, the securing-bolt and its nut and the discharge-tube being shown in elevation. Fig. 2 is a view in vertical section at right angles to Fig. 1 of a similar fragment of a boot, the discharge-tube being removed. Fig. 3 is a side elevation of the boot mounted for use. Fig. 4 is a side elevation of an adjustable hoe fixed upon its shank.

Upon the inner face of the boot A, in its lower front portion, is a projection or shoulder, J, below which is a depression or recess, $A^2$, in which is formed a vertical slot, B, around which the recess has a flat surface, A′.

The drill-tooth C, which, by being pointed at either end and uniformly curved to adapt it to the curvature of the main body of the boot, is rendered reversible in a well-known manner, has at its mid-length a countersink, *d*′, to receive the head *d* of a bolt, D, which extends through the tooth and through the slot B in the body of the boot, and receives upon its threaded end a securing-nut, E, the flat face of which adapts it to fit either in connection with a washer or otherwise against the corresponding flat portion A′ of the depression $A^2$.

By the provision of the depression or recess $A^2$ below the shoulder J the inner end of the bolt and the nut thereon are brought so far toward the front as to be overhung by the shoulder, and thus contact of the discharge-tube F with such bolt and nut is prevented, while by reason of the plane portion A′ the application of a wrench to the nut, which on a concave surface would be difficult, is rendered easy.

By the provision of the slot B vertical adjustment of the tooth C, without removing the bolt or its nut, is readily effected, a slight reverse movement of the nut being sufficient to loosen it when it is desired to fix the tooth in a higher or in a lower position.

I am aware that cultivator-shanks have been made with a slot therein for the purpose of adjusting the hoe or point, and also that points on drill-boots have been made adjustable by means of a series of bolt-holes in the front part of the boot; and therefore I do not broadly claim either a slotted drill-boot or a vertically-adjustable hoe or point.

Having described my invention, I claim—

1. In a drill-boot, a vertical slot in the front part thereof, in combination with the bolt D, nut E, and shoulder J, substantially as and for the purposes specified.

2. The described drill-boot A, having a vertical slot, B, in the front thereof, a flat bearing-surface, A′, for the nut E, and an inwardly-projecting shoulder, J.

3. In a drill-boot, a vertical slot in the front thereof, in combination with the bearing-surface A′ for the nut E.

4. A drill-boot, in the inner curved lower front portion of which is a flat bearing-surface, in which is formed an elongated perforation or slot, the perforation being adapted to receive the holding-bolt which carries the drill-tooth, and the flat bearing-surface being adapted to receive the flat inner surface of the nut which secures the bolt and its tooth to the boot.

5. A drill-boot which is provided upon its front inner surface with a projecting tube-protecting shoulder.

6. A drill-boot which is provided with an inwardly-projecting tube-protecting shoulder, and with a vertically-adjustable tooth, the inner end of the securing-bolt of which is overhung by such shoulder.

7. A drill-boot which is provided with a vertical slot, B, and with a shoulder, J, which overhangs such slot.

8. A drill-boot which has in its inner front portion a flat surface, A′, in which is a vertical slot.

9. A drill-boot on the front inner portion of which is a flat surface, in which is an opening for the reception of a securing-bolt.

10. In a drill-boot, the combination of the tube-protecting shoulder J, the bolt D, and the discharge-tube F.

11. The combination, in a drill-boot, of the tube-protecting shoulder J, the vertically-adjustable tooth C, and the securing-bolt D.

12. The combination, in a drill-boot, of an inwardly-projecting tube-protecting shoulder, a depression or recess below such shoulder, an opening in such depression, a bolt in such opening, and a drill-tooth upon such bolt.

13. The combination, in a drill-boot, of a protecting-shoulder, a depression or recess below such shoulder, an opening in such depression, a bolt in such opening, and a reversible tooth upon such bolt.

14. In a drill-boot, a drill-tooth which is secured to the body of the boot by a bolt, in combination with a shoulder which overhangs the inner end of the bolt and its nut, and prevents the discharge-tube from being brought into contact with the same.

15. In a drill-boot, a projecting shoulder upon the front inner face thereof, such shoulder being adapted, as described, to protect the seed-tube against injury through contact with the securing-bolt of the drill-tooth.

JOHN F. KELLER.

Witnesses:
O. M. BALL,
W. D. HARRINGTON.